(No Model.) 6 Sheets—Sheet 1.
B. BARON.
MACHINE FOR BREAKING AND MAKING FILLERS FOR CIGARS.

No. 452,011. Patented May 12, 1891.

WITNESSES
Dan'l Fisher
G. M. Finley

INVENTOR
Bernhard Baron,
by W. L. Howard, atty (No Model.)   6 Sheets—Sheet 2.
B. BARON.
MACHINE FOR BREAKING AND MAKING FILLERS FOR CIGARS.
No. 452,011.   Patented May 12, 1891.

(No Model.) 6 Sheets—Sheet 3.
B. BARON.
MACHINE FOR BREAKING AND MAKING FILLERS FOR CIGARS.
No. 452,011. Patented May 12, 1891.

WITNESSES
Dan'l Fisher
A. M. Finley

INVENTOR
Bernhard Baron,
by Geo. W. T. Howard,
atty.

(No Model.) 6 Sheets—Sheet 4.
B. BARON.
MACHINE FOR BREAKING AND MAKING FILLERS FOR CIGARS.
No. 452,011. Patented May 12, 1891.

WITNESSES
Dan'l Fisher
G. M. Finly

INVENTOR
Bernhard Baron,
by G. H. W. T. Howard
atty.

(No Model.) 6 Sheets—Sheet 5.
B. BARON.
MACHINE FOR BREAKING AND MAKING FILLERS FOR CIGARS.

No. 452,011. Patented May 12, 1891.

WITNESSES
Dan'l Fisher
G. M. Finley

INVENTOR
Bernhard Baron
by G. H. W. T. Howard
Atty.

(No Model.) 6 Sheets—Sheet 6.
B. BARON.
MACHINE FOR BREAKING AND MAKING FILLERS FOR CIGARS.
No. 452,011. Patented May 12, 1891.
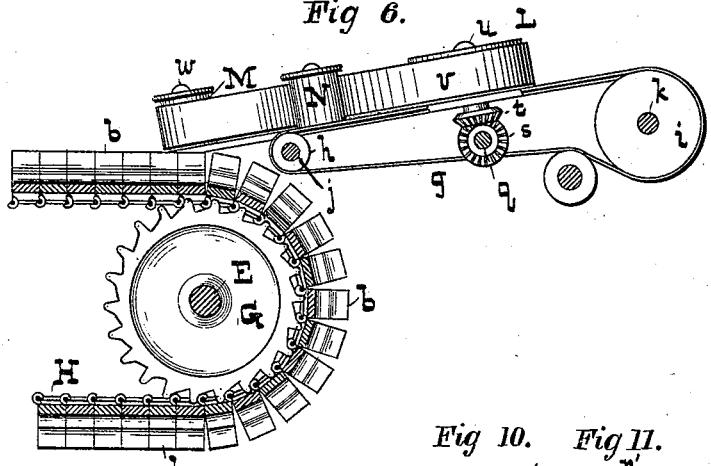
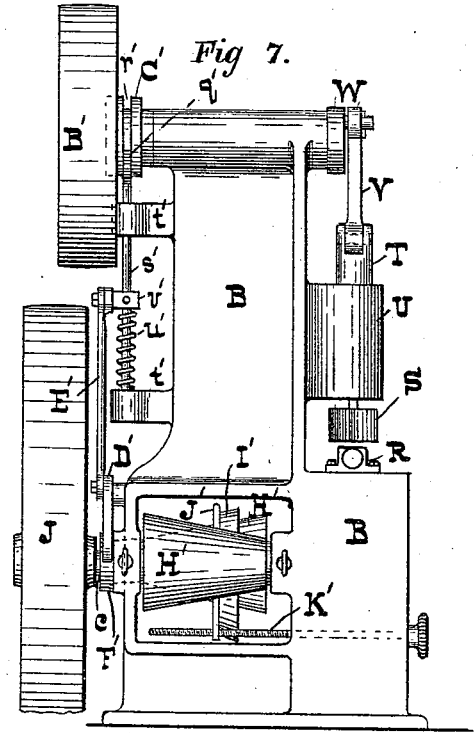
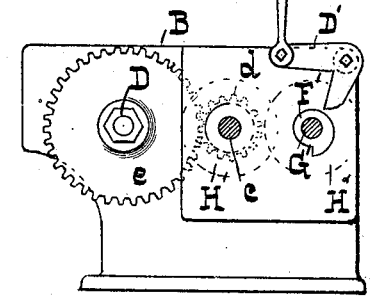

UNITED STATES PATENT OFFICE.

BERNHARD BARON, OF BALTIMORE, MARYLAND.

MACHINE FOR BREAKING AND MAKING FILLERS FOR CIGARS.

SPECIFICATION forming part of Letters Patent No. 452,011, dated May 12, 1891.

Application filed October 6, 1890. Serial No. 367,149. (No model.)

*To all whom it may concern:*

Be it known that I, BERNHARD BARON, of the city of Baltimore, in the State of Maryland, have invented certain Improvements in Machines for Breaking and Making Fillers of Cigars, of which the following is a specification.

In the description of the said invention which follows reference is made to the accompanying drawings, forming a part hereof, and in which—

Figure 1:
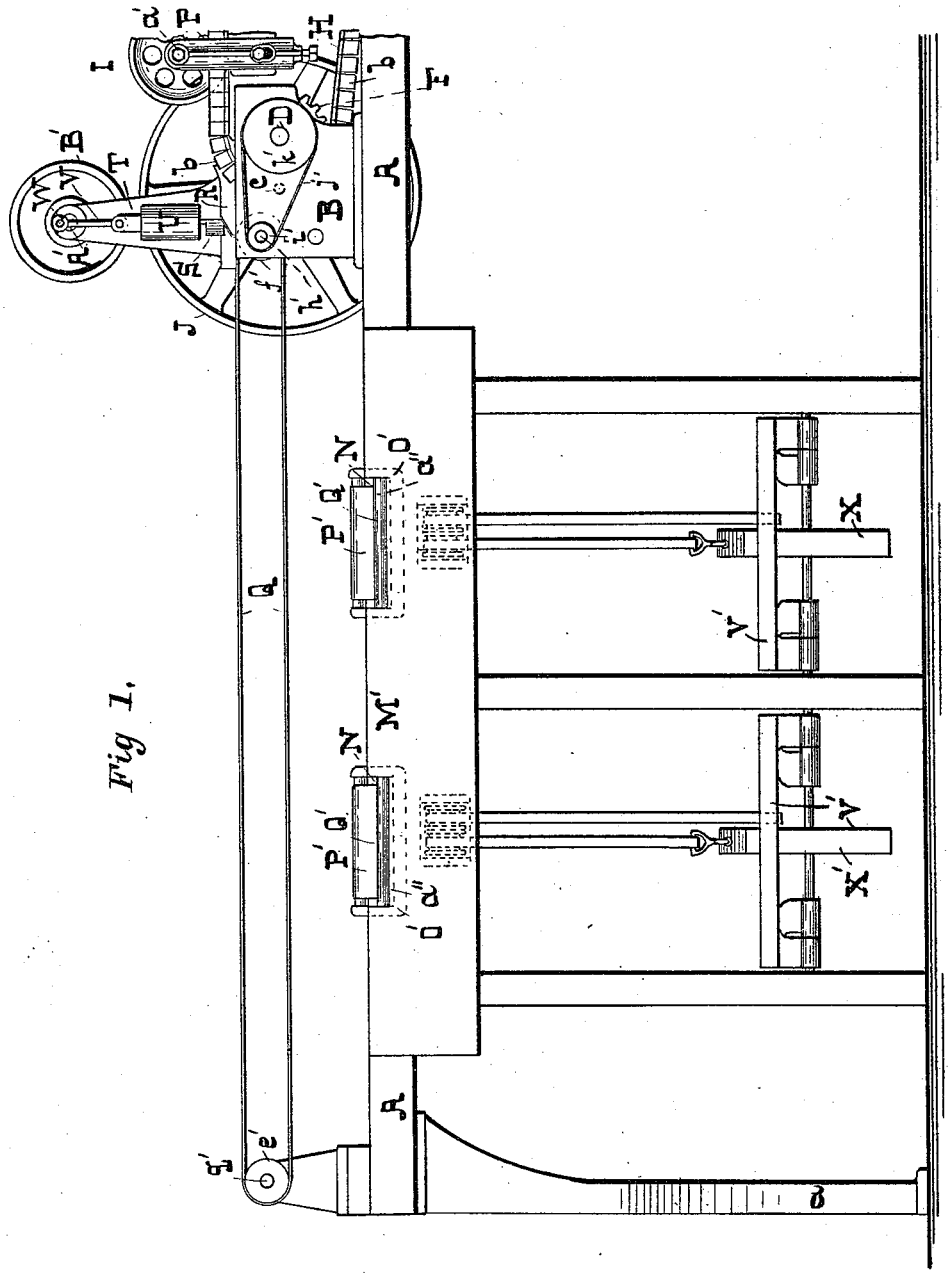
Figure 2:
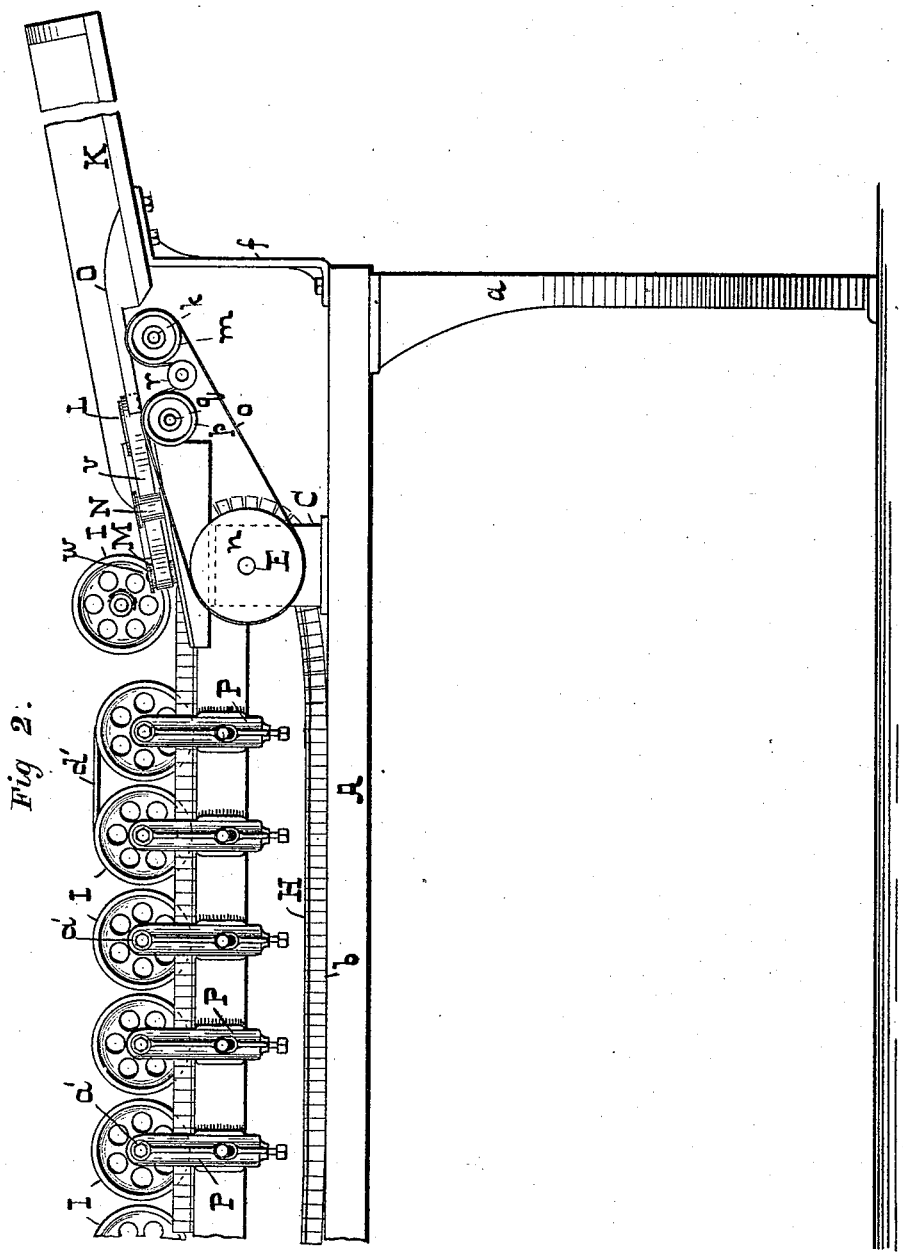
Figure 3:
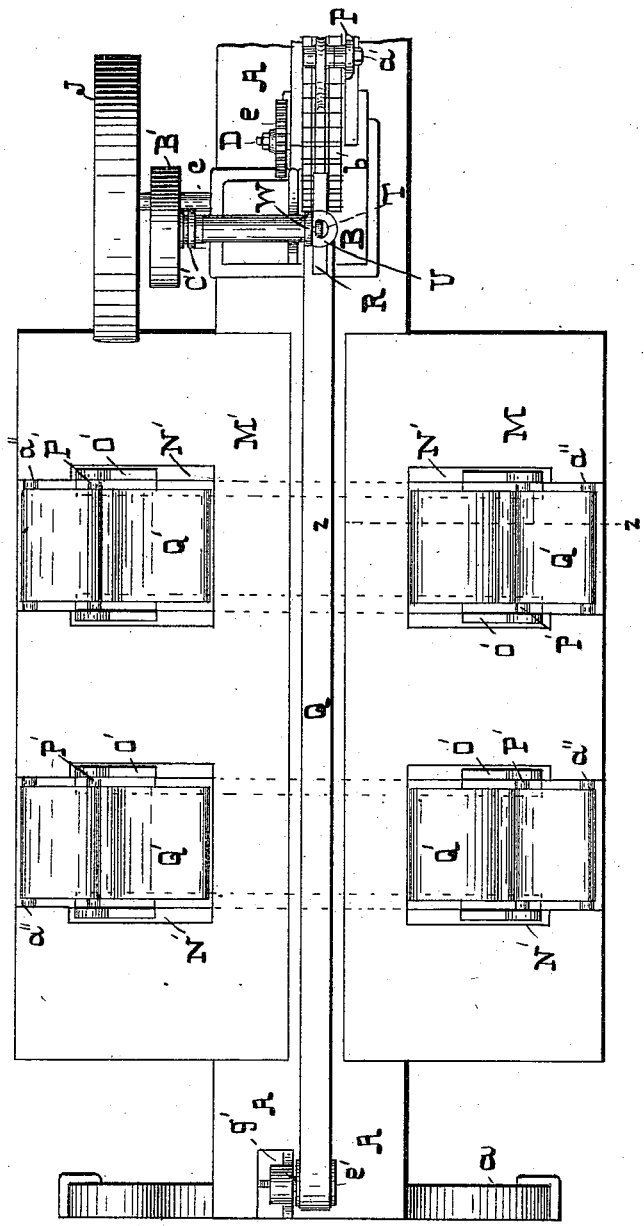
Figure 4:
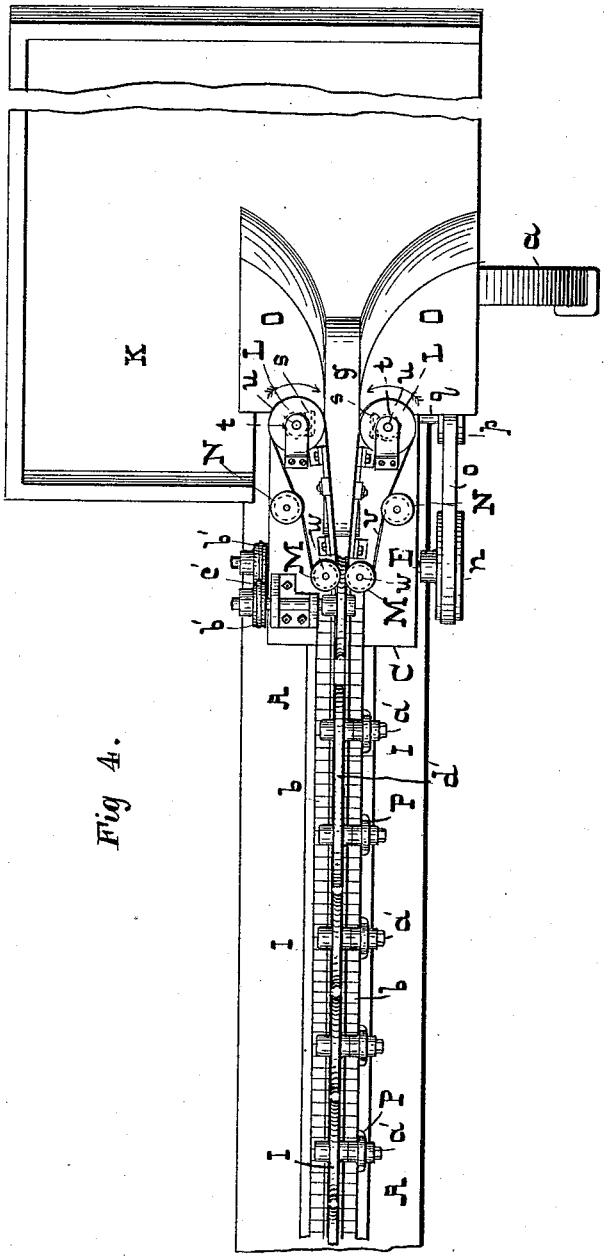
Figure 5:
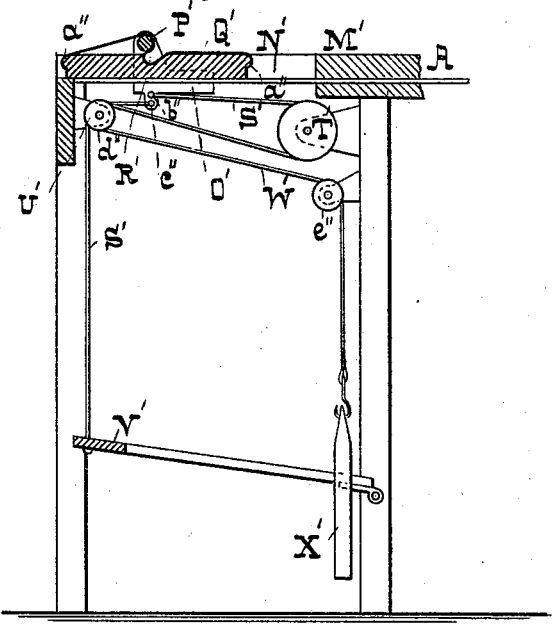

Figures 1 and 2, taken together, represent an exterior side view of the improved machine; and Figs. 3 and 4 a top or plan view of the same. Fig. 5 is a cross-section of Fig. 3, taken on the dotted line $z\ z$. Figs. 6 to 15, inclusive, are details of the machine on an enlarged scale.

Referring to the drawings, A is a frame having legs $a$.

B and C are stands secured to the frame A.

D and E are shafts supported, respectively, by the stands B and C, carrying the sprocket-wheels F and G. The sprocket-wheel G is shown on an enlarged scale in Fig. 6, and the one F, which is not shown enlarged, is a counterpart of it.

H is a chain belt, formed of links in the usual manner, stretched over the sprocket-wheels F and G. To each link of the chain belt H is secured a block $b$, cut out to the shape in cross-section to which the under side of the filler is to be brought. A face view of one of these blocks is shown in Fig. 9, and in this case the bottom of the cavity is semicircular and the upper portion somewhat enlarged in width, for a purpose hereinafter described. These blocks taken together form a continuous gutter or channel to receive the tobacco, which is introduced thereto by means hereinafter described and in which the said tobacco is pressed by means of a series of rollers I, having edges so shaped as to bring the top of the filler, which at this time is a continuous roll of tobacco, to the desired form. In the present case the edges of the said rollers are grooved, as shown in Figs. 3 and 4, and correspond in curvature to the bottom of the blocks $b$.

The mechanism for moving the chain belt H consists of a driving-pulley J on a shaft $c$, having its bearings in the stand B. Fastened to this shaft is a pinion $d$, in engagement with a gear $e$ on the shaft D, carrying the sprocket-wheel F. The movement of the sprocket-wheel G is derived from the chain belt; or, in other words, it is an idler.

The feed mechanism consists of a table K, preferably in an inclined position, secured to the frame A by means of a foot $f$. (See Fig. 2.) The inner edge of the table is cut away to form a slot, and in this slot is situated an endless belt $g$, which runs on pulleys $h$ and $i$, fastened to shafts $j$ and $k$. The shaft $k$ has a pulley $m$ at one end, which is driven from a larger pulley $n$ on the sprocket-wheel shaft E by means of a belt $o$. This belt also passes over a pulley $p$ on a shaft $q$, which shaft is also used for another purpose, hereinafter described, and over a tightening-pulley $r$. The shaft $q$ carries two miter-gears $s$, which are in engagement with two other miter-gears $t$ on vertical shafts $u$. The miter-gears $s$ and $t$ are all shown in dotted lines in Fig. 4 and one of each in full lines and on an enlarged scale in Fig. 6. On the shafts $u$ are pulleys L, which are connected by belts $v$ to other and smaller pulleys M on studs $w$. The belts $v$, which run in the direction indicated by the arrows, are tightened by rollers N.

O O are blocks on the table K, with rounded faces to guide the tobacco to the belts $g$ and $v$.

The rollers I run loosely on fixed studs $a'$, which project from brackets P. These brackets are vertically adjustable, in order that the height of the space between the periphery of the rollers and the bottom of the channel in the blocks $b$ of the chain belt may be regulated. This adjustment also admits of the rollers being set so that the tobacco is gradually compressed as it is carried longitudinally of the machine. The first of the series of rollers I is driven from the shaft F through the medium of two small pulleys $b'$ and a belt $c'$. The other rollers or any of them may run loosely and be driven by the filler or roll of tobacco, and some or all of them are connected by a rubber belt $d'$, as shown in Fig. 2. This belt bears on the filler in the same manner as the edges of the rollers, and has in the present case a grooved face.

Q is an endless apron on the rollers $e'$ and $f'$, having shafts $g'$ and $h'$. The shaft $h'$ has a pulley $i'$, which is connected by a belt $j'$ to a larger pulley $k'$ on the shaft D. The office of this apron is to carry the completed fillers, when cut off the continuous filler by means of a knife, hereinafter described, to positions where they may be conveniently reached by the persons who apply the binders.

R is a guide bolted to the stand B to conduct the continuous filler to the endless apron Q, and it is situated at the point where the chain belt begins to pass around the sprocket-wheel F. (See particularly Fig. 1.)

S is the knife to sever the continuous filler into pieces, which constitute the fillers proper. The knife may have any desired shape, so as to cut the filler squarely across or at an angle; or it may be V-shaped, as shown in the drawings, Figs. 1, 7, and 13. This knife, which is close to the rear end of the guide R, is attached to the lower end of a plunger T, adapted to have a vertical reciprocating movement within a lug U, forming part of the stand B. The upper end of the plunger T is connected by means of a link V to a crank W on the end of a shaft $A'$. The other end of the said shaft is provided with a loose pulley $B'$, the hub of which has four segmental depressions $m'$ in its face. Secured to the shaft $A'$ and adjoining the hub of the pulley $B'$ is a collar $C'$. This collar, which, as before stated, is attached to the shaft $A'$, is connected to the hub of the pulley $B'$ by means of a pin $o'$, which rests against a spring $p'$, and is projected by it outward so as to bring its end into one of the segmental slots $m'$; but as this connection has to take place only at intervals the pin $o'$ is normally retained in a concealed position or with its end not projecting from the collar by means of a wedge $q'$, which rests in a groove $r'$ in the collar. This wedge is shown enlarged in Figs. 7, 8, and 15, the last figure being an edge view. The wedge $q'$ is formed on the end of a rod $s'$, which passes through lugs $t'$ on the stand B, and it is held in this position by means of a spiral spring $u'$, which is confined endwise between the lower lug and a collar $v'$ on the stem. The tripping operation, which disengages the wedge $q'$ from the pin $o'$ and allows the pin to enter one of the slots $m'$ and thereby give a stroke of the knife S, is effected by a bell-crank $D'$, which is connected to a pin on the collar $v'$ of the stem $s'$ by means of a pitman $E'$ and a single toothed disk $F'$ on the shaft $G'$. This shaft is driven by means of reversed cones $H'$ and an intervening ring of leather $I'$. The speed is changed by moving the leather ring longitudinally of the cones through the medium of a shifter $J'$ and a threaded stem $K'$, having a suitable knob, as shown. This cone mechanism is not new and forms no part of the present invention.

$M'$ represents tables extending laterally from the sides of the frame A, against which the operators who apply binders to the fillers stand. Before each operator is an opening $N'$, provided with metallic rails at the sides, and in this opening and supported by the rails is a carriage $O'$, having a roller $P'$.

$Q'$ is an apron formed of a piece of a canvas, rubber, or some other suitable material attached at its upper ends to strips $a''$.

$R'$ is a pocket formed in the upper surface of each table, into which the apron is depressed to form a loop to receive the binder and filler.

$S'$ is a cord attached to the carriage at $b''$, and it leads over a sheave $T'$, back over another sheave $U'$, and thence down to a treadle $V'$. A second cord $W'$, connected to the carriage at $c''$, leads over a sheave $d''$, back over another sheave $e''$, and down to a counterbalancing-weight $X'$. The effect of the weight is to retain the carriage and its roller yieldingly in the position shown in Fig. 5.

The machine being in motion, the operation of breaking or making a continuous filler and cutting it into short pieces which are adapted as fillers proper is as follows: The tobacco is first reduced to strips by tearing, stripping, or cutting the leaf longitudinally thereof, and the material thus prepared is placed on the table K. The feeding operator, who stands at the table K, bunches the strips of tobacco to the proper size and feeds them by hand between the blocks O and in contact with the belts $g$ and $v$. These belts, which move in the same direction, carry the bunched tobacco toward the chain belt H and convey it into the continuous groove or channel formed by the grooved blocks $b$, and as the space between the belts $v$ is tapered, as shown in Fig. 4, the tobacco in moving onward is somewhat compressed sidewise in its passage to the channel. Upon reaching the first roller I which is driven the tobacco is compressed downward from the wider to the narrower part of the channel or gutter, and this compressing operation is continued as the tobacco passes under the groove-faced rubber belt $d'$ and the other rollers I. The groove-faced rubber belt keeps the tobacco down and straight for a considerable portion of its movement and prepares it for further compression by the other rollers, until at last, or when it approaches the end of the chain belt, it is finally compressed into a continuous strip or filler of the desired size and density. At this point the continuous filler is guided by the guide R to the endless apron Q, and the knife S, coming down closely in the rear of the guide, cuts off a portion of the tobacco-strip, which constitutes a filler proper. This filler is deposited on the endless apron Q. The length of the filler proper is governed entirely by the rapidity of rotation of the driven cone $H'$, and, as before stated, this is regulated primarily by the shifter $J'$. As the fillers are delivered opposite the tables $M'$ each operator thereat takes them separately and, placing a filler with a binder in the loop formed by the depression of the apron in the pocket in the table-top, places his foot on the treadle, and thereby causes the roller to roll up the filler in the binding-leaf. Upon the removal of the foot from the treadle the roller P' is carried back by the weight X' and the bound filler is left on the apron.

I make no claim herein to any specific construction of the knife to sever the continuous filler into short fillers, nor to the combination, with the filler-forming mechanism, of a table, a conveyer, and filler-rolling-up devices, as such are claimed in my application, Serial No. 378,550, for method and machine for making fillers for cigars pending herewith. Neither do I claim herein the method of making cigar-filler claimed in said application.

I claim as my invention—

1. In a machine for forming the fillers for cigars, a chain belt having a groove in its upper surface, combined with compressing devices to form the upper side of the said filler, a guide to turn out the continuous filler from the grooved chain belt, a knife in the rear of the guide having a reciprocating movement to cut the continuous filler into short pieces, and an endless apron to carry the completed fillers away from the said forming-chain, substantially as specified.

2. In a machine for forming the fillers for cigars, a chain belt having a groove in its upper surface, combined with compressing devices to form the upper side of the said filler, a guide to turn out the continuous filler from the grooved chain belt, and a knife in the rear of the guide having a reciprocating movement to cut the continuous filler into short pieces, substantially as specified.

BERNHARD BARON.

Witnesses:
WM. T. HOWARD,
GEO. E. SPOOR.